United States Patent [19]

Rath

[11] 4,456,309

[45] Jun. 26, 1984

[54] WHEEL SLIDE PROTECTION SYSTEM

[75] Inventor: Heinrich B. Rath, Vallendar, Fed. Rep. of Germany

[73] Assignee: Lucas Industries Limited, Birmingham, England

[21] Appl. No.: 262,910

[22] PCT Filed: Sep. 18, 1980

[86] PCT No.: PCT/GB80/00144

§ 371 Date: May 12, 1981

§ 102(e) Date: May 12, 1981

[87] PCT Pub. No.: WO81/00834

PCT Pub. Date: Apr. 2, 1981

[30] Foreign Application Priority Data

Sep. 18, 1979 [GB] United Kingdom ............... 7932247

[51] Int. Cl.³ .......................... B60T 8/02; B60T 13/00
[52] U.S. Cl. ............................... 303/10; 188/181 A; 303/116; 303/119
[58] Field of Search ............... 303/113–119, 303/68–69, 61–63, 10–12, 91–93; 188/181 A, 181 R, 264 P, 72.4, 72.5, 181 T, 361–363, 369–370, 187

[56] References Cited

U.S. PATENT DOCUMENTS

| 2,818,244 | 12/1957 | Ropar | 188/181 A X |
| 3,667,816 | 6/1972 | Harned | 303/119 |
| 3,731,767 | 5/1973 | Lefort | 303/10 X |
| 3,829,166 | 8/1974 | Menar | 303/119 X |
| 4,036,331 | 7/1977 | Hayashi et al. | 188/187 |

FOREIGN PATENT DOCUMENTS 2026139 12/1968 France .
2004338 3/1979 United Kingdom .
2029914 3/1980 United Kingdom .

*Primary Examiner*—Douglas C. Butler
*Attorney, Agent, or Firm*—Holman & Stern

[57] ABSTRACT

A wheel slide protection system for a vehicle, such as a car or motor cycle, has a modulator valve (25) controlling the supply of pressure fluid to a wheel brake (22) sensing device (9) for sensing an incipient wheel slide condition of the braked wheel and providing a signal to cause the valve (25) to apply a slide-corrective modification to the braking force, and a pump (13) supplying the modulator valve and incorporated in an axle assembly (15) adapted to carry the wheel (16) to be braked. A fluid reservoir (12) and the modulator valve may additionally be incorporated in the axle assembly (15).

30 Claims, 4 Drawing Figures

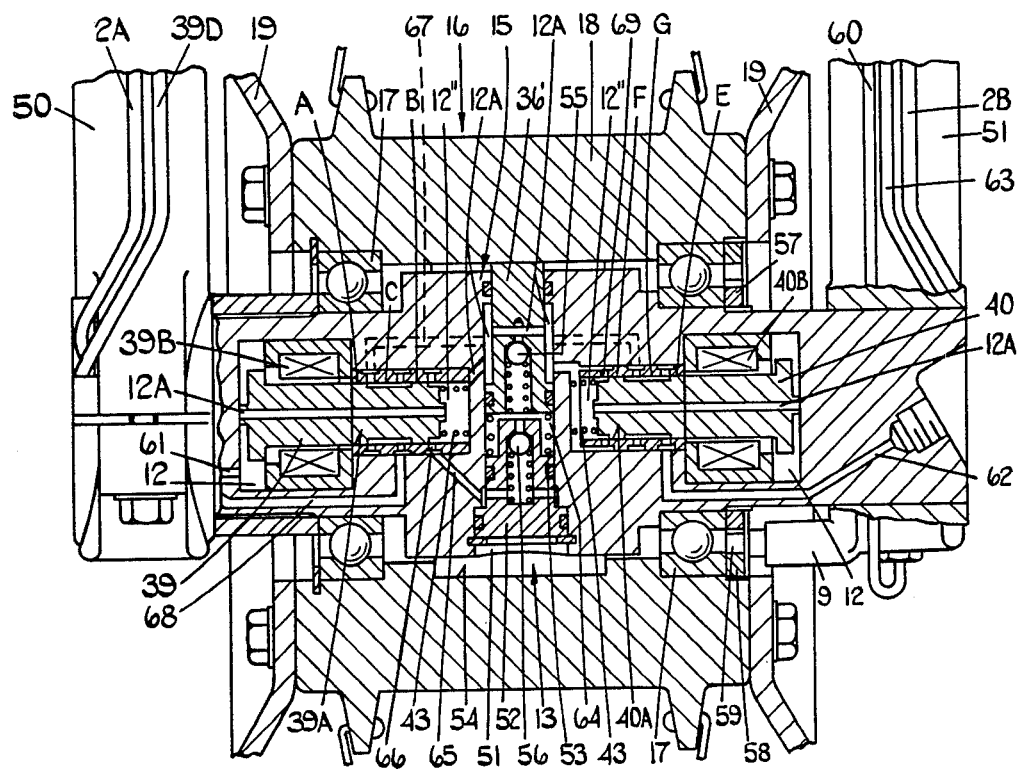

WHEEL SLIDE PROTECTION SYSTEM

CROSS REFERENCE TO RELATED APPLICATION

The invention of this application is disclosed in corresponding International Application No. PCT/GB80/00144, filed Sept. 18, 1980, the benefit of which is being claimed.

BACKGROUND OF THE INVENTION

1. Field of the Invention

This invention relates to an hydraulic wheel slide protection system for a vehicle, the system being of the general kind in which pressure fluid is supplied to a wheel brake under the control of a modulator valve, and sensing means is arranged to sense an incipient wheel slide condition of the braked wheel during running of the vehicle, the valve being operative, in response to a signal from the sensing means, to modify the braking force applied to the wheel in order to correct the slide condition.

2. Description of the Prior Art

Some conventional wheel slide protection systems employ a wheel driven pump operating in conjunction with the modulator valve and, for practical reasons, it is advantageous to install the valve close to, or even as a unit with, the pump. This places the pump in a location close to the wheel where only limited space is available and which is also unsatisfactory in that it provides a dirty operating environment.

In other conventional wheel slide protection systems, the pump is driven from the vehicle engine or transmission, or by a separate motor, and this arrangement indicates the placing of the pump in the engine compartment, where equipment is housed in cramped conditions, or elsewhere on the vehicle frame remote from the wheels. In order to minimise and simplify the runs of hydraulic conduit, it is desirable to place the modulator valve near to the pump, thereby adding to the problem of available space.

BRIEF SUMMARY OF THE INVENTION

According to one aspect of the present invention, the modulator valve of the wheel slide protection system is supplied with fluid by means of a pump incorporated in an axle assembly adapted to carry the wheel to be braked, the pump being located adjacent to the wheel and adapted to be driven therefrom as a function of the speed of that wheel only.

In one convenient arrangement of the system, a fluid reservoir is additionally incorporated in the axle assembly, as is, preferably, the modulator valve.

According to another aspect of the present invention, the modulator valve of the wheel slide protection system is incorporated in an axle assembly adapted to carry the wheel to be braked, the modulator valve being located adjacent to the wheel to be braked and operating to control the braking of that wheel only.

Preferably the working fluid is supplied to the modulator valve by means of a pump which may conveniently also be incorporated in the axle assembly. It may further be convenient to incorporate a fluid reservoir of the system in the axle assembly.

BRIEF DESCRIPTION OF THE DRAWINGS

The invention will now be described, by way of example, with reference to the accompanying drawings in which:

FIGS. 3 and 4 are respectively views similar to FIG. 2 of two embodiments of the braking system of the invention incorporated in a motor cycle axle assembly.

DETAILED DESCRIPTION

Figure 1:
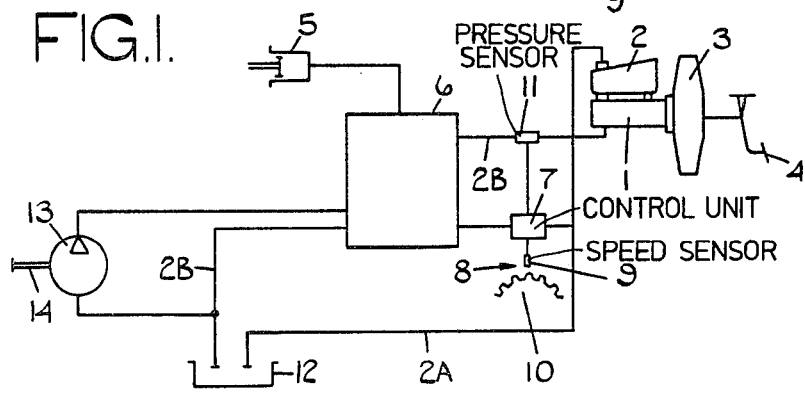
FIG. 1 is a diagrammatic representation of a braking system incorporating one form of the wheel slide protection system of the invention.

The braking system shown in FIG. 1 of the drawings includes a conventional master cylinder 1 having a reservoir 2 and arranged to be actuated via a vacuum-assisted device 3 by means of a driver-operated pedal 4, the master cylinder being arranged to supply a brake 5 under the control of an electrical solenoid valve 6, operation of which is governed by an electrical control unit 7. The control unit receives an input from a wheel speed detector, indicated generally at 8, which includes a wheel speed sensor 9, normally an inductive device, and a co-operative toothed rotor 10 rotatable with the wheel to be braked and conveniently secured to a brake disc, in the case of a disc brake. The control unit also receives an input from a pressure sensor 11 for the purpose to be described.

A low pressure reservoir 12 is supplied directly via a line 2A from the master cylinder reservoir 2 and is also connected to the valve 6. A pump 13 is conveniently arranged to be driven by a wheel to be braked by the brake 5, the driving connection being represented at 14. The pump inlet is connected to the reservoir 12 and the pump outlet is connected to the valve 6.

Figure 2:
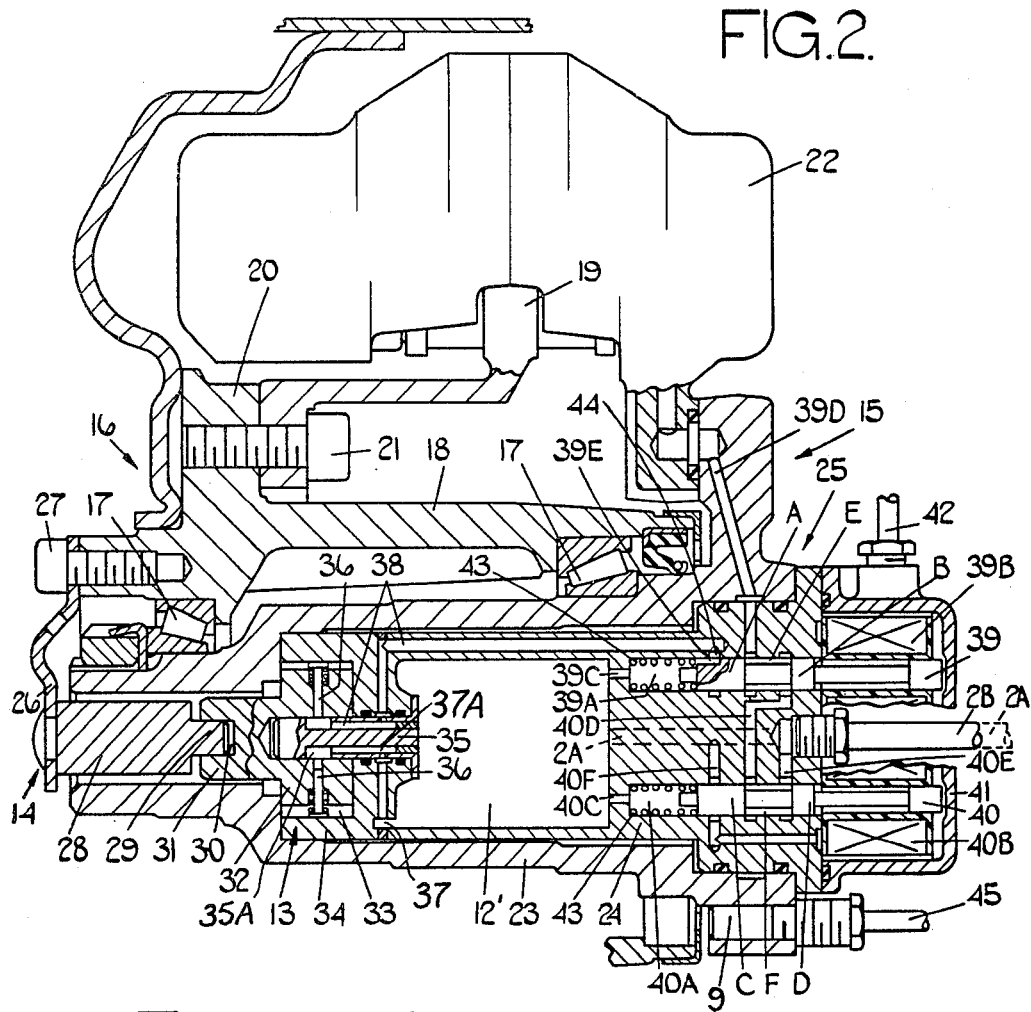
FIG. 2 is an elevational view, partly in cross-section, of part of a wheel and brake assembly and the associated parts of one practical form of the wheel slide protection system of the invention.

FIG. 2 illustrates a vehicle wheel stub-axle assembly which incorporates, in practical form, various components of the braking system shown schematically in FIG. 1. The stub-axle assembly designated generally at 15, carries a vehicle wheel assembly 16 rotatably mounted thereon by way of taper roller bearings 17 housed within a hub 18 of the wheel. A brake disc 19 is secured to a flange 20 of the hub by means of bolts 21 and co-operates with a conventional disc brake caliper 22 to brake the wheel assembly 16, when required, in the usual manner.

In the particular embodiment shown, the wheel-carrying portion 23 of the stub-axle is hollow and houses a body 24 incorporating the pump 13, the reservoir 12' and the modulator valve which is indicated generally at 25. The pump is driven from the wheel by the driving connection 14 which includes a coupling plate 26 secured to the hub 18 by means of bolts 27 and a drive pin 28 made fast for rotation with the plate 26, as by riveting for example, the free end of the pin forming an axially extending tongue 29 adapted for driving engagement with a slot 30 formed in the drive input shaft 31 of the pump 13. The shaft 31 is fast with a rotor 32 housed within a space 33 defined between a wall portion 34 of the body 24 and a spigot 35, the latter serving for the rotational mounting of the rotor 32.

The rotor 32 carries a plurality of radial pistons 36 which are spring urged radially outwardly into engagement with the internal surface of the wall portion 34 which is eccentric in relation to the rotational axis of the rotor. The pistons 36 are therefore moved radially by engagement at their outer ends with the eccentric wall portion 34 to reciprocate during rotation of the rotor and act, in conjunction with conventional porting to draw fluid from the reservoir 12 via port 37 and inlet passages 37A into chamber 35A and expel the fluid along outlet passages 38 towards the 37 radial port 44 at modulator valve 6. More particularly, in the position shown in FIG. 2 the lower piston 36 has moved radially outwardly to draw fluid into chamber 35A through inlet passages 37A and with continued rotation of rotor 32, this piston will be driven radially inwardly to pump fluid in the chamber through outlet passages 38.

The modulator valve 6 of FIG. 1 is in the form of a solenoid valve 25 which includes a pair of valve elements in the form of spools 39, 40 sliding in respective bores 39A, 40A of the body 24 under the action of respective solenoids 39B, 40B housed within an end cap 41 of the body and connected by a cable 42 to the control unit 7 shown in FIG. 1. The spool 39 has a pair of lands A and B spaced by a recess E and the spool 40 has a pair of lands C and D spaced by a recess F, both spools being urged to the right, as seen in FIG. 2, by respective springs 43. The left-hand end of the bore 39A communicates with the reservoir 12' via a passage 39C and the bore communicates, also, at an intermediate location thereof, with the pressure cylinder (not shown) of the brake caliper 22 via a passage 39D. A radial port 44 permits communication between the bore 39A and the passage 38, when the spool 39 is in the position shown. The left-hand end of the bore 40A communicates with the reservoir 12' via a passage 40C and the bore 40A is connected at an intermediate location thereof to the bore 39A by a passage 40D and at an adjacent location by a passage 40E to the line 2B, which is the supply line from the master cylinder 1. The bore 40A is also connected by a passage 40F to the line 2A.

The sensor 9 of the wheel speed detector 8 is mounted in the stub-axle and connected by a cable 45 to the control unit 7, the toothed formation 10 being rotatable with the hub 18.

When the wheel assembly 16 is rotating under normal conditions, the solenoids 39B and 40B will be de-energised and the valve spools 39 and 40 will assume the positions shown in the drawings under the action of the springs 43. As the wheel rotates and drives the rotor 32, the reciprocating action of the pistons 36 will draw fluid from the reservoir 12' and feed it along the passage 38, whence it will pass through the port 44 and along a space 39E formed by a recess in the peripheral surface of the spool land A, to be returned to the reservoir 12 through the passage 39C. The pumped fluid is thus under normal conditions, recycled at low pressure and has no effect upon the operation of the brake. Actuation of the brake is effected from the master cylinder 1 as a result of pressure applied to the pedal 4, fluid from the master cylinder travelling along the line 2B to the modulator valve 25 and thence along the passages 40E, 40D and 39D and the recesses E and F into the pressure cylinder of the brake caliper.

The control unit 7 receives an output proportional to wheel speed from the wheel speed sensing device 8. This output is differentiated in the control unit to produce a signal representative of wheel deceleration and the signal resulting from this differentiation is compared in the control unit with a signal representative of a predetermined maximum permissible deceleration value beyond which excess wheel slip is assumed to occur. When the wheel deceleration exceeds this maximum value during braking, the control unit 7 feeds a signal to the modulator valve 6 such as to cause the solenoid 40B to move the spool 40 to the left against the action of its associated spring 43, bringing the land D to a position in which it interrupts communication between the line 2B and the passage 40D, thereby cutting-off the supply of fluid from the master cylinder 1. At the same time, the land C moves leftwards to a position in which it unblocks passage 40F, thereby connecting the caliper cylinder to the reservoir 12 in order to relieve the pressure in the braking cylinder 5 and thus allow the wheel to recover from the skid condition.

When the control unit senses that the wheel has recovered sufficiently, and with the solenoid 40B still in its energised state, the solenoid 39B is energised to move the spool 39 to the left against the action of the associated spring 43 to bring the land B to a position in which it lies to the left-hand side of the passage 40D in order to provide a barrier independently of the spool 40 against fluid from the master cylinder reaching the brake pressure cylinder. At the same time, the land A moves to a position in which it is located to the left of the port 44, thereby enabling fluid from the pump 13 to pass through the port 44 and along the recess E and passage 39D into the brake. The solenoid 40B could be de-energised at this stage, if desired.

Since the pump rotates at or proportional to wheel speed, it re-pressurises the brake at a rate dependent upon wheel speed (which in turn is dependent upon the level of adhesion between the wheel and the road) until the pressure in the brake pressure cylinder is equal to the pressure in the master cylinder, which is still actuated by the pedal 4. This is sensed by the pressure sensor 11 (FIG. 1) which is connected to the modulator valve 6 and the master cylinder 1 so as to compare the respective pressure thereof and produce a signal when these reach a predetermined relationship, usually equality. Typically, the pressure sensor 11 would be a pressure transducer or a switch having a movable element subjected at its respective sides to the two pressures to be sensed and arranged to produce a signal when the pressures are substantially equal. The signal from the pressure switch 11 is fed to the control unit 7 which then provides an output to de-energise the solenoid 39B, together with the solenoid 40B if this has not already been de-energised. The system then assumes its original condition in which the output from the pump 13 is recirculated and the master cylinder is once more connected to the brake pressure cylinder.

In the event that excessive wheel slip should recur while the pump 13 is connected to the brake, the solenoid 39B must be de-energised and the solenoid 40B, if de-energised, must be re-energised to reduce the pressure applied to the brake pressure cylinder.

FIG. 3 illustrates an axle assembly of a motor cycle incorporating the braking system of the invention. Components equivalent to those of FIG. 2 are identified by the same reference numerals, for ease of reference. The axle 15 is fixed by conventional means in non-rotatable manner to a pair of forks 50, 51. The wheel assembly 16 is rotatably mounted on the axle by way of bearings 17 and has a pair of spaced braking discs 19 secured thereto. The axle assembly 15 houses a pump 13 and has a diametrically extending bore 51 containing a piston 36' and a closure member 52 acting as an abutment for a spring 53 which urges the piston 36' against an eccentric internal wall portion 54 of the wheel hub 18. The piston 36' is caused to reciprocate as the hub 18 rotates and co-operates with ball valves 55 and 56 to draw fluid from a reservoir 12", the fluid being either recirculated to the reservoir or supplied to the brake, according to whether or not a skid condition of the wheel is sensed. Because of the restricted room within the axle assembly, the reservoir 12" is made up of a series of spaces within the axle interconnected by passages 12A.

The modulator valve has a pair of spools 39, 40 arranged respectively at either side of the pump 13 in opposed relationship and slidably reciprocable within respective bores 39A, 40A of the axle 15 under the action of respective solenoids 39b, 40B. The spool 39 has a pair of lands A, B separated by a recess C and the spool 40 has a pair of lands E and F separated by a recess G.

The bearing 17 is locked in position by an inner ring 57 screwed onto an externally threaded portion of the axle 15 and by an outer ring 58 screwed into an internally threaded portion of the hub 18. The ring 58 is formed with a multiplicity of internal teeth 59 arranged to move in succession past the wheel speed sensor 9 so as to co-operate with the sensor in providing a signal representative of wheel speed which is fed via a cable 60 to the control unit 7 (FIG. 1). A pipe 2A housed on or within the fork 50 supplies fluid directly from the master cylinder reservoir 2 via a passage 61 into the reservoir 12". A passage 2B in or within the fork 51 supplies fluid from the master cylinder 1 via a passage 62 to the spool 40. Electric current for the solenoids is supplied via a line 63 and a pipe 39D is arranged on or within the fork 50 to supply pressure fluid to the brake.

As the wheel assembly 16 rotates, the piston 36' is caused to reciprocate, radially outward movement thereof drawing liquid from the reservoir 12"through the ball valve 55 into a pump chamber 64 and radially inward movement thereof expelling fluid from the pump chamber through the ball valve 56 along a delivery passage 65.

When the wheel is rotating under normal conditions, the solenoids are inoperative and the spools assume their positions shown in the drawing. The delivery passage 65 is then connected via a port 66 to the reservoir 12" so that the pump recirculates fluid at low pressure without having any effect on the brake. The brake is actuated from the master cylinder 1, pressure fluid from which flows along the passage 62 through the space G of the spool 40 and via a transfer passage 67 into the space C of the spool 39, whence it enters a supply passage 68 leading to the pipe 39D supplying the brake cylinder.

As previously, detection of an insipient wheel slide condition by the sensor 9 causes the control unit 7 to energise the solenoid 40B so as to move the spool 40 to the left, causing the land E to block-off the supply passage 62 from the brake master cylinder, and simultaneously connecting the transfer passage 67 via the space G and a port 69 to the reservoir 12, which has the effect of connecting the brake cylinder to the reservoir because the supply passage 68 is already connected via the spool 39 to the transfer passage 67.

When the control unit senses that the wheel has recovered sufficiently, and with the solenoid 40B still energised, the solenoid 39B is energised to move the spool 39 to the right to bring the land A to a position in which it blocks off the transfer passage 67 in order to provide a barrier independently of the spool 40 against fluid from the master cylinder reaching the brake pressure cylinder. Simultaneously, the land B moves to the right-hand side of the passage 65 to interrupt communication between that passage and the reservoir 12" and to connect the passage via the space C to the brake supply passage 68, thereby enabling fluid from the pump 13 to pass to the brake cylinder and actuate the brake. The solenoid 40B could then be de-energised, if desired. With the system in this condition, the brake is pressurised by the pump in the manner described with reference to FIG. 2 until the excess wheel slide condition has been corrected, whereupon the system returns to its condition as illustrated, under the control of the control unit and the master cylinder is once more connected to the brake pressure cylinder for normal braking.

Figure 4:
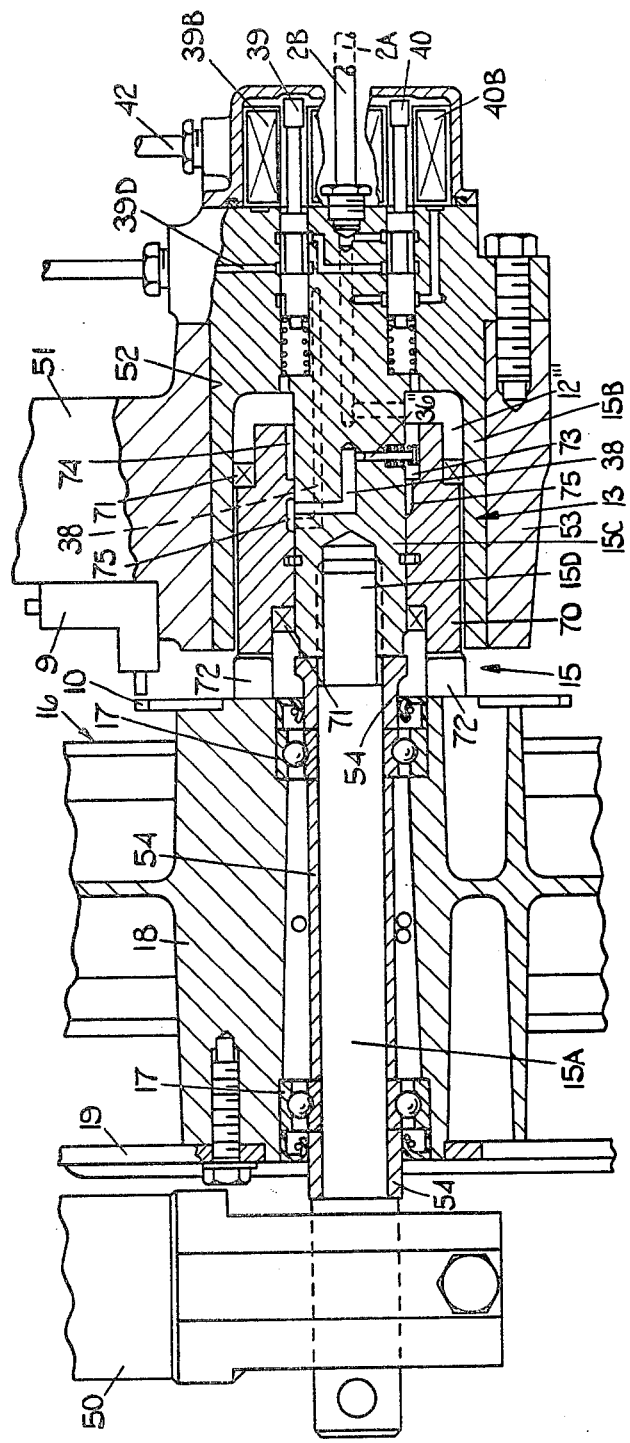

A further alternative embodiment is illustrated in FIG. 4 and again adapted for use with a motor cycle axle assembly. The reference numerals empoyled in FIG. 2 are once again used for corresponding parts in FIG. 4, for ease of reference.

The axle assembly 15 is non-rotatably mounted in motor cycle forks 50 and 51 and includes a solid spindle 15A secured in the fork 50 and extending between the forks. The axle assembly also includes a hollow housing 15B housed within an opening 52 formed in an enlarged end portion or boss 53 of the fork 51, an internal core 15C of the housing being internally threaded to receive an externally threaded end portion 15D of the spindle 15A. Spacer sleeves 54 surround the spindle 15A and support bearings 17 upon which is rotatably mounted a wheel assembly 16, to a hub 18 of which is secured a braking disc 19. The screwed interconnection between the spindle 15A and housing 15B serves to retain the wheel assembly 16 between the forks. The external periphery of the housing 15B may be non-circular and the internal surface of the boss 53 may have a corresponding shape to prevent rotation of the housing within the boss.

The pump 13 has a rotor 70 surrounding the core 15C and mounted for rotation in bearings 71, the rotor being driven from the wheel assembly by axially extending lugs 72 on the wheel hub 18 engaging in corresponding recesses in the rotor. A plurality of radial pistons 36" are slidably mounted in bores in the core 15C (only one piston being shown in the drawing), the pistons being arranged within an axial recess 73 in the rotor, the internal surface 74 of which recess is formed eccentrically to the rotor axis. The piston 36" are spring-urged into engagement with the eccentric suface 74 and are thereby caused to reciprocate in their bores as the rotor rotates. Porting 75 is arranged in conventional manner in relation to the rotor so that reciprocation of the pistons draws fluid from the reservoir 12''' and expels it along an outlet passage 38 towards the modulator valve 6.

The modulator valve in this embodiment is constructionally and operationally similar to that shown in the embodiment of FIG. 2 and does not require additional description. The sensor 9 is secured to the fork 51 and the co-operating toothed formation is again carried by the hub 18.

It is possible for the pump to be driven other than by the vehicle wheel, as for example by an electric motor. In such a case, it would be desirable to control the pump in a manner dependent upon wheel speed and this may conveniently be done by way of the wheel speed sensor and control unit.

The modulator valve may take various alternative forms other than those described above. One suitable type is a fluid-supported de-boost type modulator, of which one example is illustrated in FIG. 3 of our published Application No. 2004338A. With this arrangement, fluid is circulated continuously be a wheel-driven pump at a pressure sufficient to support a piston of the modulator. The pressure is variable by a restriction which is dependent upon braking pressure, the restriction being by-passed during slide corrective operation. As described in our aforesaid Application, operation of the modulator valve is governed by a control valve 25 and in a typical practical arrangement of the system of the present invention, such a valve or its equivalent would be provided in mechanically or electrically operated form.

In an alternative arrangement described in our published Application No. 2029914A, trapped fluid in the pressure chamber of a fluid supported de-boost type modulator is relieved during skid control, the chamber being re-charged by a wheel-driven pump.

It will be seen that the system arranged in accordance with the invention enables the pump and modulator to be placed adjacent to each other in a location in which the pump may conveniently be driven by the wheel to be braked, the axle assembly providing a protected environment for those components incorporated in it. In the system of the invention, the pump and modulator valve of any one braked wheel act independently from those of any other wheel and the modulator valve responds to a skid condition of that one wheel only.

I claim:

1. In a hydraulic wheel slide protection system for a vehicle including a modulator valve arranged to control the supply of working fluid to a wheel brake, a pump adapted to be driven from the wheel and operable to supply fluid to the modulator valve, and sensing means arranged to sense an incipient wheel slide condition of the wheel during running of the vehicle, and to produce a signal when such a condition is sensed, the modulator valve being operative in response to said signal to modify the braking force applied to the wheel in order to correct the slide condition, the improvement comprising the pump is incorporated within a hollow axle part of an axle assembly upon which the wheel is supported for rotation there around, the pump being located adjacent to the wheel and adapted to be driven therefrom as a function of the speed of that wheel only.

2. A system according to claim 1, wherein a fluid reservoir is additionally incorporated in the axle assembly and the pump is arranged to draw fluid therefrom.

3. A system according to claim 1 or claim 2, wherein the modulator valve is incorporated in the axle assembly.

4. A system according to claim 1, wherein the pump is a reciprocatory piston pump.

5. A system according to claim 1, wherein the modulator valve includes a pair of independently operable valve elements which, when an incipient wheel slide condition is sensed, respectively interrupt the supply of fluid from the master cylinder to the associated brake and convert the function of the pump from a fluid re-circulatory mode to a brake operative mode.

6. A system according to claim 1 and further comprising a fluid reservoir and, wherein the pump has an inlet communicating with the fluid reservoir and an outlet communicating with the modulator valve, said outlet being controlled by the modulator valve to direct fluid therefrom alternatively to the reservoir or to the brake.

7. A system according to claim 1, wherein a fluid reservoir and the modulator valve are housed within the axle assembly, and, together with the pump, are arranged in longitudinal succession therealong.

8. A system according to claim 1, wherein the pump, modulator valve and a fluid reservoir are housed within a separate body itself carried within the axle asembly.

9. A system according to claim 1, wherein the axle assembly is adapted to be supported between the forks of a motor cycle.

10. A system according to claim 1, wherein the pump and modulator valve are housed substantially within a rim of the wheel to be braked.

11. A system according to claim 10, wherein the pump is of the radial piston type actuated by an eccentric internal surface of the hub.

12. A system according to claim 10, wherein the modulator valve includes a pair of solenoid-operated spools arranged in opposed relationship at either side of the pump.

13. A system according claim 10, wherein the pump and modulator valve are housed within a hollow boss formed at the free end portion of one of the motor cycle forks 14. A system according to claim 13, wherein the pump and modulator valve are contained in a separate housing inserted within and secured to said boss.

15. A system according to claim 14, wherein the separate housing has a non-circular external periphery and the internal surface of the boss is of corresponding form, whereby rotation of the housing within the boss is prevented.

16. An hydraulic wheel slide protection system for a vehicle comprising a modulator valve arranged to control the supply of working fluid to a wheel brake, and sensing means arranged to sense an incipient wheel slide condition of the wheel during running of the vehicle and to produce a signal when such a condition is sensed, the modulator valve being operative, in response to said signal to modify the braking force applied to the wheel in order to correct the slide condition, characterised in that the modulator valve is incorporated in an axle assembly adapted to carry the wheel to be braked, and operates to control the braking of that wheel only.

17. A system according to claim 16, wherein working fluid is supplied to the modulator valve by means of a pump.

18. A system according to claim 17, wherein the pump is incorporated in the axle assembly.

19. A system according to claim 11, wherein the pump is adapted to be driven from the wheel carried by the axle assembly.

20. A system according to any one of claims 17 to 19, wherein a fluid reservoir of the system is incorporated in the axle assembly and the pump is arranged to draw fluid therefrom.

21. A system according to any one of claims 16 to 19, wherein the modulator valve includes a pair of independently operable valve elements which, when an incipient wheel slide condition is sensed, respectively interrupt the supply of fluid from the master cylinder to the brake and convert the function of the pump from a fluid re-circulatory mode to a brake operative mode.

22. A system according to claim 21, wherein the pump has an inlet communicating with the fluid reservoir and an outlet communicating with the modulator valve, said outlet being controlled by the modulator valve to direct fluid therefrom alternatively to the reservoir or to the brake.

23. A system according to claim 10, wherein the modulator valve, the pump and a fluid reservoir are housed within a separate body itself incorporated in the axle assembly.

24. A system according to claim 16, wherein the axle assembly is adapted to be supported between the forks of a motor cyle.

25. A system according to claim 24, wherein the pump and modulator valve are housed substantially within a hub of the wheel to be braked.

26. A system according to claim 25, wherein the pump is of the radial piston type actuated by an eccentric internal surface of the hub.

27. A system according to claim 25, wherein the modulator valve includes a pair of solenoid-operated spools arranged in opposed relationship at either side of the pump.

28. A system according to claim 16, wherein the pump and modulator valve are housed within a hollow boss formed at the free end portion of one of the motor cycle forks.

29. A system according to claim 28, wherein the pump and modulator valve are contained in a separate housing inserted within and secured to said boss.

30. A system according to claim 29, wherein the separate housing has a non-circular external periphery and the internal surface of the boss is of corresponding form, whereby rotation of the housing within the boss is prevented.

* * * * *